(No Model.)

H. BELL.
FILTERING FUNNEL.

No. 267,133. Patented Nov. 7, 1882.

WITNESSES:
Fred. G. Dieterich
A. T. Lyne

INVENTOR.
Henry Bell
By Dunn & Co
ATTORNEYS.

N. PETERS, Photo-Lithographer, Washington, D. C.

UNITED STATES PATENT OFFICE.

HENRY BELL, OF BALTIMORE, MARYLAND.

FILTERING-FUNNEL.

SPECIFICATION forming part of Letters Patent No. 267,133, dated November 7, 1882.

Application filed March 14, 1882. (No model.)

*To all whom it may concern:*

Be it known that I, HENRY BELL, of the city of Baltimore, in the State of Maryland, have invented a new and useful Improvement in Filtering-Funnels, of which the following is a full, clear, and exact description, reference being had to the annexed drawings, forming part of this specification.

This invention relates to filtering-funnels which are provided with vent-tubes; and the invention consists in the novel construction of the funnel and combination therewith of the tube, as hereinafter described.

Figure 1:
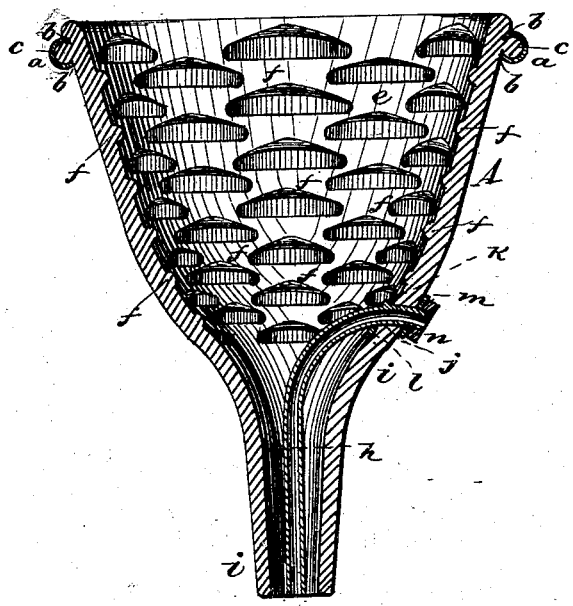
Figure 2:
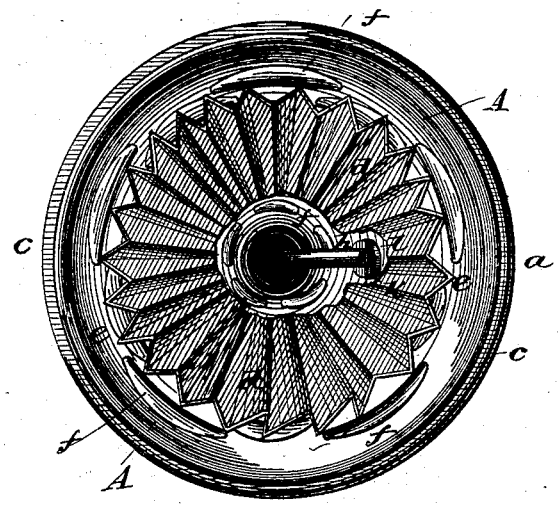

In the accompanying drawings, Figure 1 is a vertical section of the funnel, and Fig. 2 is a top or plan view with the filtering-paper partly broken away.

The funnel A, which is preferably made of glass, porcelain, or similar material, is constructed with an annular projection, $a$, around the brim, and grooves $b$ on each side of the projection, into which grooves fit the edges of a rubber band, $c$, extending around and covering the projection $a$. With this construction brittle material which is comparatively inexpensive may be successfully used in the manufacture of funnels, since the rubber band is adapted to break the force of ordinary accidental knocks, and will thus prevent the chipping or cracking of the funnel.

To prevent the filtering-paper $d$ from being pressed down close to the inner surface of the bowl $e$ by the weight of the liquid, and thus obstructing the proper flow of the latter, I construct the said inner surface with segmental projections $f$, made sloping from the top to the ends, and arranged in concentric rows in such manner that the projections of one row shall cover the openings between the projections of the next lower row, sufficient space being left at the ends of the projections to allow the liquid to pass down freely from one row to another. The filtering-paper is thus supported above the inner surface of the bowl, and a passage is formed between the paper and the funnel, which will insure the unobstructed flow of the liquid. The funnel is provided with a vent-tube, $h$, which is preferably made of hard rubber or glass, and which is arranged inside the neck $i$, with its upper end suitably bent and passed through an orifice, $j$, in the side of the bowl, just above the neck. The upper end of the tube is provided with a shoulder, $k$, which fits against a rubber washer, $l$, on the inside of the bowl, while another washer, $m$, is placed over the outer end of the tube, and a nut, $n$, is screwed on said end to secure the tube in place and form a water-tight joint.

It is evident that the use of a rubber band around the brim of the funnel would suggest the application of such a band to other vessels having a brim, which are made of brittle material, and I therefore do not wish to limit myself to the use above described.

Having thus described my invention, what I claim as new, and desire to secure by Letters Patent, is—

1. A funnel made of brittle material, having an annular projection around the brim, and a groove on each side of the projection, in combination with an elastic band, substantially as shown and described.

2. A funnel having the inner surface of its bowl provided with segmental projections, made sloping from the top to the ends, and arranged in concentric rows in such manner that the projections of one row shall cover the spaces between those of the next lower row, as and for the purpose described.

3. A funnel having an orifice through one side of the bowl, in combination with a vent-tube secured in the orifice by means of rubber washers and a nut, substantially as shown and described.

HENRY BELL.

Witnesses:
 JOS. KAUSTER,
 M. S. BARBER.